United States Patent [19]

Folta

[11] Patent Number: 5,259,242
[45] Date of Patent: Nov. 9, 1993

[54] TIRE HOLDING FIXTURE FOR TIRE PROCESSING MACHINE

[75] Inventor: Edward J. Folta, Anchorville, Mich.

[73] Assignee: Illinois Tool Works Inc., Glenview, Ill.

[21] Appl. No.: 645,743

[22] Filed: Jan. 25, 1991

[51] Int. Cl.$^5$ .............................. G01M 17/02
[52] U.S. Cl. ...................... 73/146; 157/13; 241/279
[58] Field of Search ............ 241/279, DIG. 31; 51/DIG. 33; 409/225, 234; 273/212, 8; 83/951; 157/13, 16; 279/2.06, 2.11; 73/146, 471, 474

[56] References Cited

U.S. PATENT DOCUMENTS

| | | | |
|---|---|---|---|
| 3,331,412 | 7/1967 | Sornsen | 157/14 |
| 4,185,856 | 1/1980 | McCaskill | 285/18 |
| 4,307,797 | 12/1981 | Belansky | 192/108 |
| 4,323,414 | 4/1982 | Severson | 157/13 X |
| 4,380,927 | 4/1983 | Oda et al. | 73/146 |
| 4,414,843 | 11/1983 | Kounkel et al. | 73/146 X |
| 4,479,381 | 10/1984 | Kounkel et al. | 73/146 X |
| 4,574,628 | 3/1986 | Maikuma et al. | 73/146 |
| 4,668,119 | 5/1987 | Galletti | 403/349 |
| 4,677,848 | 7/1987 | Flory | 73/146 |
| 4,852,398 | 8/1989 | Cargould et al. | 73/146 |

*Primary Examiner*—Z. R. Bilinsky
*Attorney, Agent, or Firm*—Schwartz & Weinrieb

[57] ABSTRACT

A tire holding fixture comprises upper and lower simulated wheel halves disposed about upper and lower wheel half supports, and a guide disposed coaxially with respect to the wheel half supports. The guide cooperates with the wheel halves and wheel supports so as to center a tire upon the tire holding fixture. The upper wheel half support is designed to be inserted into the lower wheel half support. There are noncontinuous no-lead thread segments disposed about the interior of the lower wheel half support, and about the exterior of the upper wheel half support. These thread segments are designed to be interengagable so as to form a multiple stepped bayonet retention system, capable of holding the wheel supports together. Locking pins are translatable within the wheel half supports so as to allow corotation of the wheel half supports for processing a tire.

23 Claims, 3 Drawing Sheets

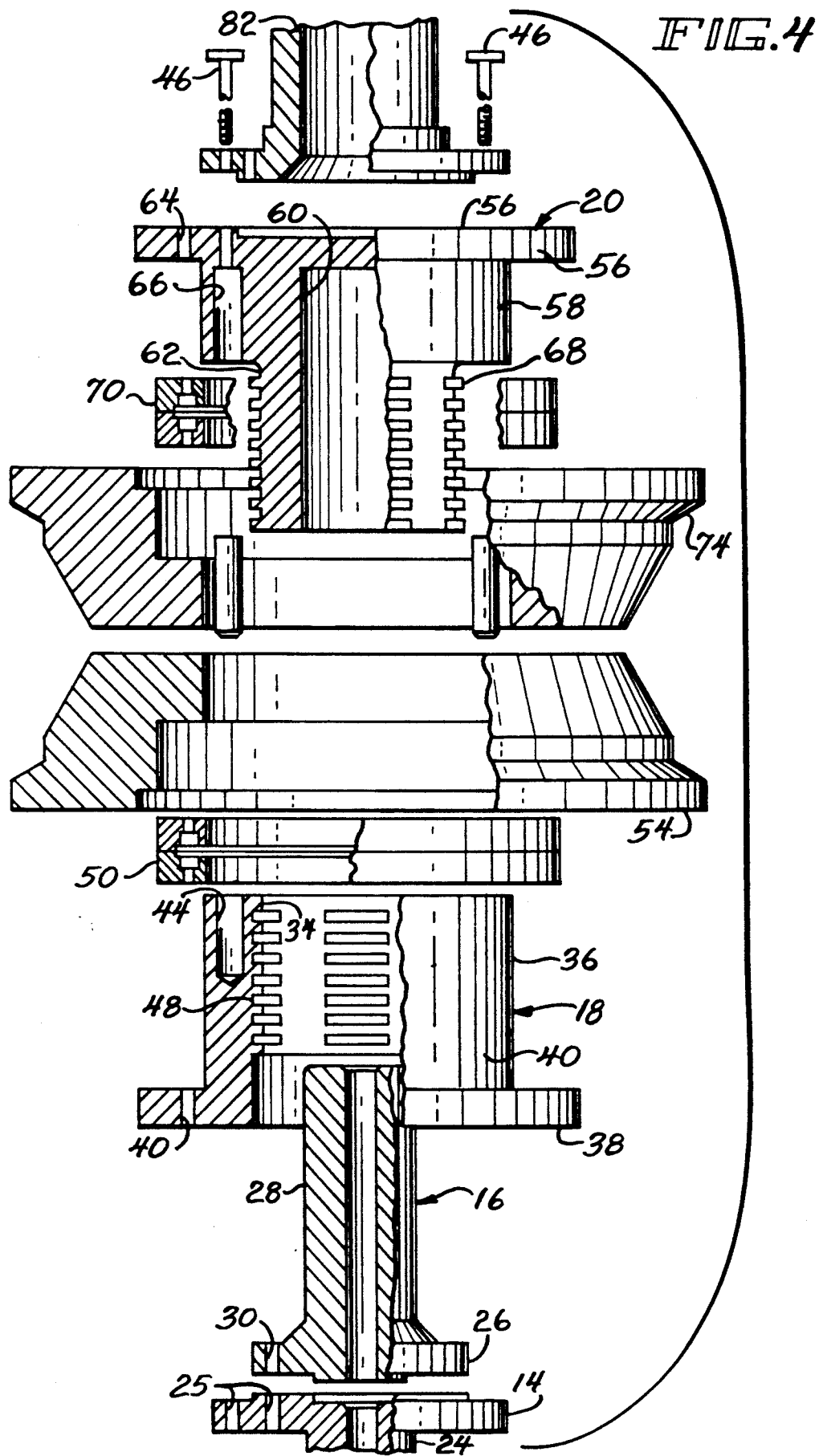

TIRE HOLDING FIXTURE FOR TIRE PROCESSING MACHINE

FIELD OF THE INVENTION

The present invention relates generally to a quick release automatic tire holding device for use with a machine for balancing, grading, grinding, or otherwise processing tires. In modern assembly line plants, machines that are able to operate at high rates of speed are highly desirable. The faster a machine can operate, the more product that machine can manufacture within a given time period. As the amount of manufactured product per time period increases, revenues due to the sale of those products usually increase accordingly, due to increased supply. This is especially true in connection with the manufacture of fungible goods having limited lifetimes, such as, for example, tires.

BACKGROUND OF THE INVENTION

In connection with the mass production of tires for cars, trucks, construction vehicles, and the like, it is necessary to test each tire manufactured so as to insure compliance with product specifications, safety of the product, and maintenance of a high level of quality control. Many tires must be graded in order to aid the consumer in the purchase of tires. In addition, it is necessary to balance each of these tires so as to insure proper and even wear of the tread thereon, and to insure that the tires will provide a smooth ride when installed upon a vehicle. This must be done to each tire individually because each separate tire will have different balancing needs due to imperfections in the manufacturing process. Furthermore, many tires must be ground so that the consumer can receive a product that will adequately serve the needs of that particular consumer.

All of the above testing procedures, among others, can take considerable time because each tire must be mounted upon a testing machine or fixture in order for the testing procedures to be performed. The time taken to perform each one of these necessary testing procedures can reduce revenues generated by means of the sales of such tires. Therefore, it is desirable to have a tire holding fixture that can operate quickly, in order to reduce the time needed to perform the needed testing procedures.

It is well known in the art to provide a device for mounting tires that has a two part simulated wheel, so that the tires do not have to be mounted upon an actual wheel in order for the testing procedures to be performed. Such devices are disclosed, for example, in the following patents.

| Sorensen | 3,331,412 | 06/18/67 |
| Oda et al | 4,380,927 | 04/26/83 |
| Kounkel et al | 4,414,843 | 11/15/83 |
| Kounkel et al | 4,479,381 | 10/30/84 |
| Maikuma et al | 4,574,628 | 03/11/86 |
| Flory | 4,677,848 | 07/07/87 |
| Cargould et al | 4,852,398 | 08/01/89 |

With these devices in mind, manufacturers of tires have desired to further increase the speed of operation of such devices. This desire has lead to the construction of tire holding fixtures that have quick release locking mechanisms. However, in order for such fixtures to actuate quickly, the fixtures often have locking means having certain stress limits. These limits may therefore present an impediment to the proper testing of the tires.

Especially in the instance of tires for trucks and construction vehicles, the tires must be subjected to high inflation pressures, which often meet or exceed the stress limits of the locking means of the tire holding fixtures, and which exert a separation force upon the two part simulated wheel, thereby resulting in improper, and inaccurate tire testing. Therefore, a tire holding fixture having a quick release locking means, which is able to withstand higher separation forces generated by means of such tire inflation pressures and testing procedures of the tires, is desired for use with machines that test tires.

OBJECTS OF THE INVENTION

A general object of the invention is to provide a tire holding fixture for use with a tire testing machine that has a quick release locking means.

Another object of the invention is to provide a tire holding fixture that is fully automatically operated.

An additional object of the invention is to provide a tire holding fixture having a two part simulated wheel with locking means so that the two parts of the simulated wheel are capable of co-rotation.

A further object of the invention is to provide a tire holding fixture having means for varying the width beneath the two parts of the simulated wheel so that the fixture is capable of mounting tires of different widths.

Another object of the present invention is to provide a tire holding fixture having for use with a tire testing machine which has a greater strength and resistance to separation of the two parts of the simulated wheel.

SUMMARY OF THE INVENTION

A tire holding fixture of the present invention is comprised of a lower wheel half support, and a wheel half support capable of holding a tire upon the fixture, and wherein a quick release locking means is also provided and which is capable of joining the wheel half supports together. One wheel half support is capable of translation between an open and a closed position, so that the fixture can accept a tire. The quick release locking means allows the fixture to be operated automatically at a fast rate of speed.

A cylindrical guide is disposed coaxially with the wheel half supports, and is useful for centering the wheel half supports about a common central axis. The lower wheel half support has no-lead thread segments disposed about its inner peripheral surface, and a lower simulated wheel half coupled about its outer diameter by means of a toothed coupling. The guide extends beyond the upper edge of the lower wheel half support.

There is sufficient space defined between the guide and the inner diameter of the lower wheel half support such that the upper wheel half support can be accommodated within such space. The upper wheel half support has an inner diameter large enough to accept the guide therein. The upper wheel half support has no-lead thread segments disposed about its outer peripheral surface. These no-lead thread segments are constructed and disposed so as to be insertable into the no-lead thread segments defined upon the lower wheel half support so as to form the quick release locking means, known as a bayonet retention system. The upper wheel half support also has an upper simulated wheel half coupled about its outer diameter by means of a toothed coupling.

Both the upper and lower wheel supports have locking bored defined therein. These locking bores are of sufficient size to accept locking pins. When these locking pins are disposed within the locking bores, the upper and lower wheel supports are capable of co-rotation, necessary for proper testing of a tire.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements throughout the several views, and wherein:

FIG. 4 is an exploded view of the tire holding fixture, showing the particular construction of the elements thereof.

DETAILED DESCRIPTION OF THE PREFERRED EMBODIMENT

Figure 1:
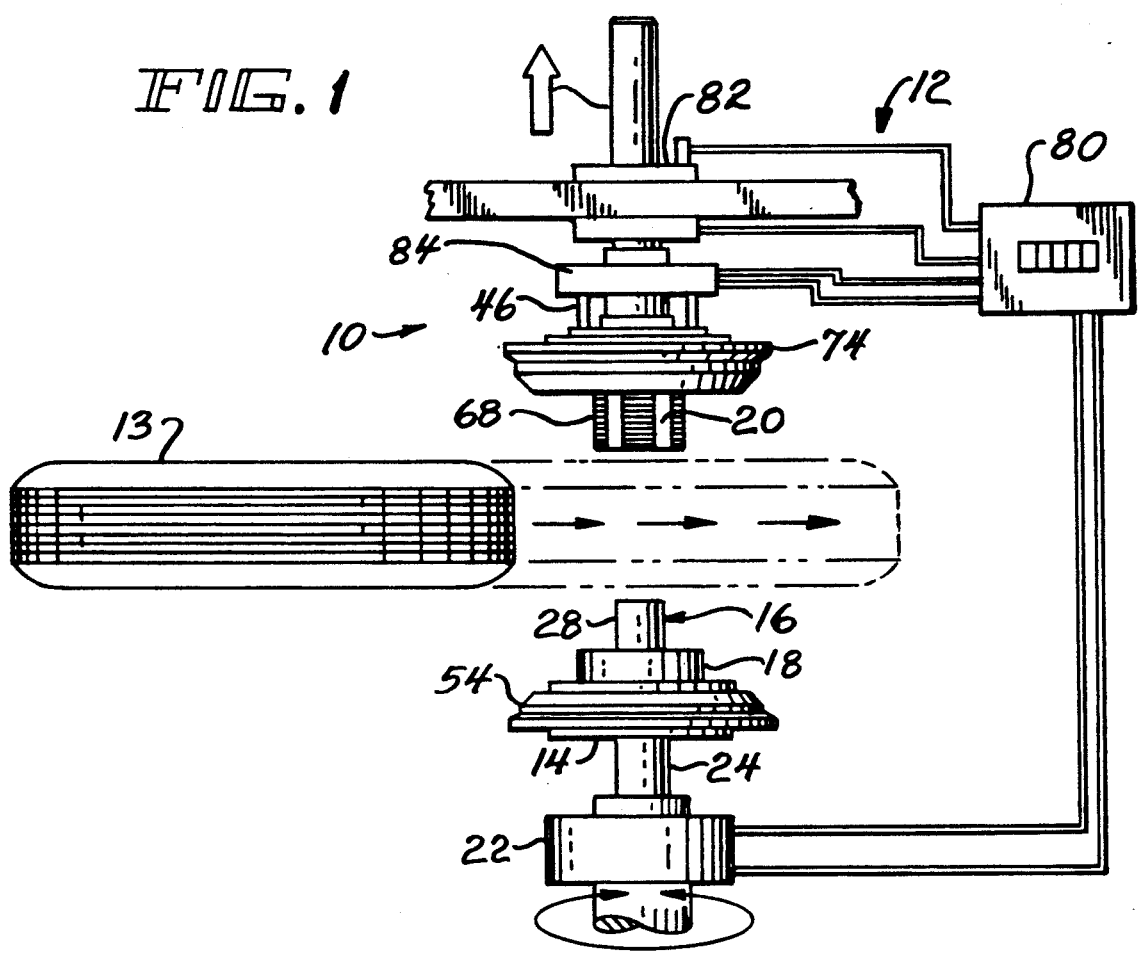
FIG. 1 is an elevational view of a tire holding fixture disposed in an open position, constructed according to the teachings of the present invention, and employed within a tire testing machine.

While the invention may be susceptible to embodiment in different forms, there is shown in the drawings, and hereinafter will be described in detail, a specific embodiment with the understanding that the present disclosure is to be considered an exemplification of the principles of the invention, and is not intended to limit the invention to that as illustrated and described herein.

Referring generally to FIG. 1, a tire holding fixture 10, constructed according to the teachings of the present invention, is disclosed. The tire holding fixture 10 is just one element of a larger, more complex tire testing machine 12, partially shown in FIG. 1 and FIG. 2. The tire testing machine 12 can perform many, various tests or processes upon a production tire 13, such as, for example, balancing, grading, and grinding. The construction and function of the tire processing machine 12 is well known in the art.

Figure 3:
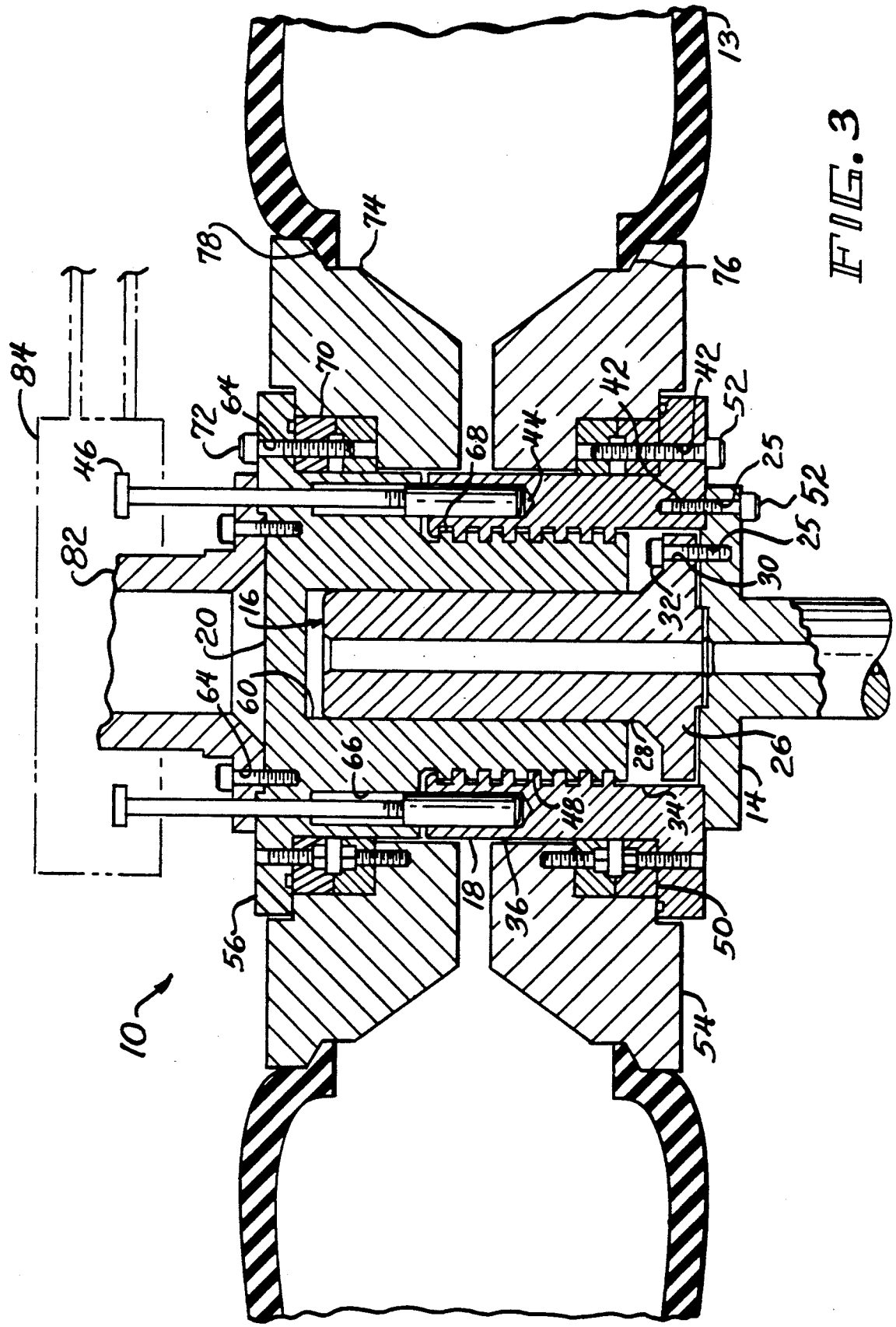
FIG. 3 is a vertical, sectional view of the tire holding fixture of FIG. 2.

Upon careful consideration of FIG. 1, and FIG. 3, the particular construction of the tire holding fixture 10 becomes evident. Generally, the tire holding fixture 10 comprises a spindle 14, a guide 16, a first, or lower, wheel half support 18, and a second, or upper, wheel half support 20. The spindle 14 is connected to a drive means 22, located within the tire processing machine 12, by means of a drive shaft 24. In this manner, the drive means 22 is able to cause the entire tire holding fixture 10 to rotate in order to process or test a tire 13. The spindle 14 also has bores 25 therein.

The guide 16 is mounted upon the spindle 14 in a coaxial fashion. The guide 16 has a mounting portion 26 and an extending portion 28, and is substantially cylindrical in shape. The mounting portion 26 abuts the spindle 14. The mounting portion 26 has apertures 30 of sufficient size to accept mounting bolts 32. The mounting bolts 32 communicate from the apertures 30 defined within the mounting portion 26 to the bores 25 defined within the spindle 14, thereby attaching the guide 16 to the spindle 14, so that the guide 16 can rotate in unison with the spindle 14. The extending portion 28 of the guide 16 is substantially perpendicular to the mounting portion 26, and extends along the axis of the spindle 14 and the guide 16. The extending portion 28 protrudes beyond the upper edge of the lower wheel half support 18, so that the guide 16 can center the lower and upper wheel half supports 18 and 20 about a common central axis.

The lower wheel half support 18 has an inner peripheral surface 34, an outer peripheral surface 36, a base 38, and a leg 40. The lower wheel half support 18 also has apertures 42, and locking bores 44 defined therein. The apertures 42 are of sufficient size to accept attaching bolts 52, and the locking bores 44 are of sufficient size to accept locking pins 46, as will be discussed below. The attaching bolts 52 extend from some of the apertures 42 defined within the lower wheel half support 18 into the bores 25 defined within the spindle 14, thereby attaching the lower wheel half support 18 to the spindle 14, so that the lower wheel half support 18 can rotate in unison with the spindle 14 and the guide 16. The base 38 abuts the spindle 14, and the leg 40 is substantially perpendicular to the base 3. The lower wheel half support 18 is disposed upon the spindle 14, and about the guide 16 so as to be coaxial with the spindle 14 and the guide 16. Thus, the leg 40 is substantially cylindrical in shape.

Axially spaced, annular bands of no-lead thread segments, or radial projections, 48 are disposed or defined upon the inner peripheral surface 34 of the lower wheel half support 18, extending radially inwardly out or away from the inner peripheral surface 34 towards the guide 16. The no-lead thread segments 48 form part of a quick release locking means, or stepped bayonet retention system, the operation of which will be disclosed hereinafter.

A toothed, quick connect coupling 50, similar in construction to the curved tooth gear coupling disclosed within the patent of Belansky, U.S. Pat. No. 4,307,797, and assigned to the assignee of the present invention, is disposed abut the outer peripheral surface 36 of the lower wheel half support 18. The disclosure of that patent is incorporated herein by reference. The toothed coupling 50 is mounted upon the lower wheel half support 18 by means of additional mounting bolts 52, which extend from the toothed coupling 50 into the apertures 42 defined within the lower wheel half support 18. The toothed coupling 50 supports a lower simulated wheel half 54, which is constructed so as to accept and fix a tire 13 thereon. The structure and operation of the lower simulated wheel half 4 will become more apparent hereinafter.

The upper wheel half support 20 forms the remainder of the tire holding fixture 10. The upper wheel half support 20 has a base 56, a leg 58, an inner peripheral surface 60, and an outer peripheral surface 62. The upper wheel half support 20 also has apertures 64 and locking bores 66 defined wherein. The base 56 is substantially perpendicular to the leg 58, and the leg 58 is substantially cylindrical in shape.

Both the peripheral surface 60 and the outer peripheral surface 62 are smaller in diametrical extent than the inner peripheral surface 34 of the lower wheel half support 18, and the radial extent defined between the guide 16 and the inner peripheral surface 34 of the lower wheel half support 18 is larger than the radial extent defined between the outer peripheral surface 62 and the inner peripheral surface 60 of the upper wheel half support 20. With this construction, the leg 58 of the upper wheel half support 20 is insertable within the leg 36 of the lower wheel half support 18.

Axially spaced, annular bands of no-lead thread segments, or radial projections, 68 are disposed or defined upon the outer peripheral surface 62 of the upper wheel half support 20 so as to extend or project radially outwardly away from the outer peripheral surface 62. The no lead thread segments 68 are disposed at such positions so as to be insertable into the no-lead thread segments 48 disposed upon the inner peripheral surface 34 of the lower wheel half support 18 when the upper wheel half support 20 is inserted into the space defined between the guide 16 and the inner peripheral surface 34 of the lower wheel half support 18.

Figure 2:
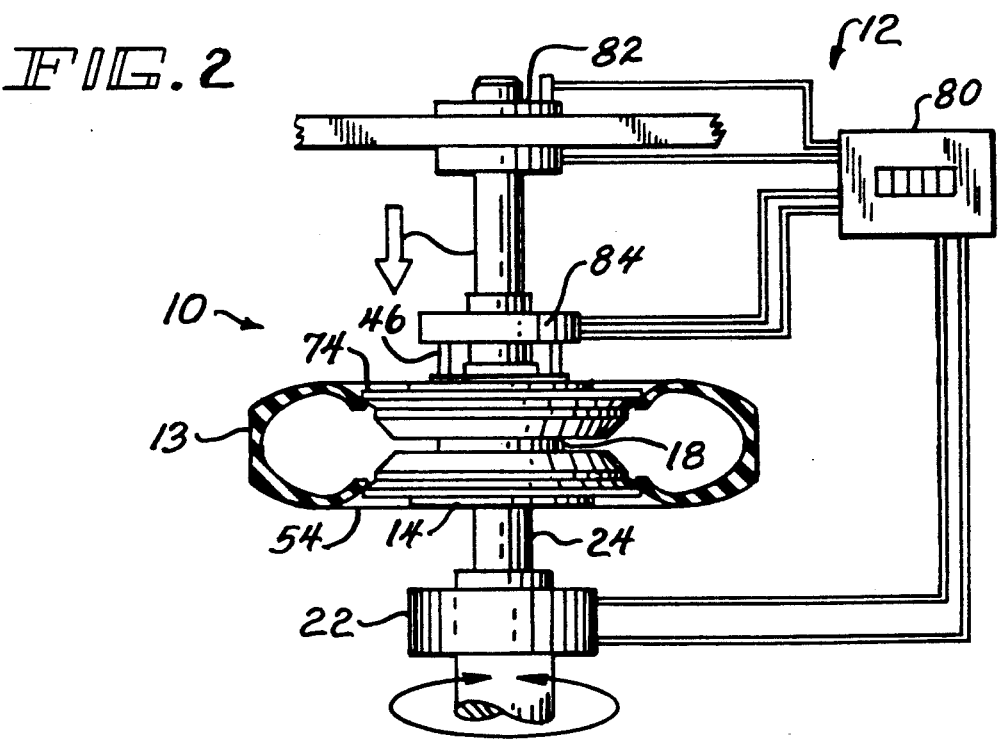
FIG. 2 is an elevational view of a tire holding fixture disposed in a closed position, while holding a tire, and employed within a tire testing machine.

Both of the thread segments 48 and 68 are of similar construction, and are not continuous along either the inner peripheral surface 34 or the outer peripheral surface 62 of their respective wheel half supports 18 and 20. Instead, both of the thread segments 48 and 68 are located at alternating 30 degree angular segments along the circumferences defined by means of the inner peripheral surface 34 and the outer peripheral surface 62 of the lower and upper wheel half supports 18 and 20, respectively. This construction forms part of the quick release locking means, referred to as a multiple stepped bayonet retention system, including a plurality of interengaging segments spaced along the axis of the tire holding fixture 10, and capable of holding the lower and upper wheel half supports 18 and 20 together during the processing of a production tire 13 as shown in FIG. 2.

A toothed, quick connect coupling 70, similar in construction to the toothed coupling 50, is disposed about the outer peripheral surface of the leg portion 58 of the upper wheel half support 20. The toothed coupling 70 is mounted upon the upper wheel half support 20 by means of mounting bolts 72, which extend from the toothed coupling 70 into the apertures 64 defined within the upper wheel half support 20. The toothed coupling 70 supports an upper simulated wheel half 74, which is of a construction similar to that of the lower simulated wheel half 54 disposed about the lower wheel half support 18.

The locking bores 66 defined within the upper wheel half support 20 are of similar construction to the locking bores 44 defined within the lower wheel half support 18, and are designated to accept locking pins 46. The locking bores 44 and 46 are defined within their respective wheel half supports 18 and 20 at predetermined positions so that the locking pins 46 can be inserted in, and extend through both sets of locking bores 44 and 46, so that the lower and upper wheel half supports 18 and 20 can be joined together, defining or providing for the co-rotation during the processing of a tire 13. In the preferred construction, the locking pins 46, and locking bores 44 and 66 form part of the quick release locking means.

It is thus apparent that when considered together, the lower simulated wheel half 54 and the upper simulated wheel half 74 form an apparatus which is able to hold a production tire 13 for processing by means of the tire processing machine 12. More particularly, the lower simulated wheel half 54 has a beveled surface 76 which is the mirror image of a beveled surface 78 provided upon the upper simulated wheel half 74. Both of the beveled surfaces 76 and 78 are constructed so as to simulate the mounting surface of an actual wheel. The beveled surfaces 76 and 78, when in the proper relative positions dictated by means of the width of the production tire 13, effectively serve as an actual wheel, and allow a tire 13 to be balanced, graded, ground, or otherwise processed or tested as if the tire 13 was actually mounted upon an actual or real vehicle.

As stated above, the tire holding fixture 10 is but a part of a larger tire processing machine 12 well known in the art. The connections between the tire holding fixture 10 and the tire processing machine 12 are shown partially in FIG. 1 and FIG. 2. The tire processing machine 12 is preferably hydraulic in nature, and is driven by means of hydraulic forces generated by means of a hydraulic power source 80.

The spindle 14 is connected to the drive means 22, located within the tire processing machine 12, by means of the drive shaft 24. In this manner, the drive means 22 is able to cause the entire tire holding fixture 10 to rotate when the locking pins 46 are disposed within both sets of locking bores 44 and 66, thereby locking the two wheel half supports 18 and 20 together. The upper wheel half support 20 is connected to drive means 82, such as, for example, a hydraulic piston, or the like, which is capable of translating the upper wheel half support 20 between an open position, as shown in FIG. 1, and a closed position, as shown in FIG. 2, so that the tire holding fixture 10 can accept a tire 13 The drive means 82 also allows the upper wheel half support 20 to rotate in unison with the lower wheel half support 18. Another drive means 84, such as, for example, a piston, or the like, is connected to the locking pins 46. This drive means 84 is capable of translating the locking pins 46 into, and out of the locking bores 44 and 66, so that the two wheel half supports 18 and 20 are capable of co-rotation, and the two wheel half supports 18 and 20 are maintained in a locked disposition.

The operation of the tire holding fixture 10 will become more apparent from the following discussion. Referring initially to FIG. 1, the tire holding fixture 10 is disposed in the open position, ready to accept a tire 13 for processing. A tire 13 is placed above the lower wheel half support 18, and is then moved downwardly into engagement with the beveled surface 76 of the lower simulated wheel half 54.

With the tire 13 engaging the beveled surface 76 of the lower simulated wheel half 54, the drive means 82 forces the upper wheel half support 20 downwardly, inserting the leg 58 of the upper wheel half support 20 into the space defined between the guide 16 and the inner peripheral surface 34 of the lower wheel half support 18. The guide 16 insures that the lower and upper wheel half supports 18 and 20 are centered about a common central axis, thereby insuring that the tire 13 is centered about the tire holding fixture 10.

At this time, the no-lead thread segments 48 and 68 are rotated 30 degrees with respect to each other, and thus, are not interengaged. The upper wheel half support 20 is forced downwardly a predetermined distance dictated by means of the width of the tire 13, until the tire 13 engages the beveled surface 78 of the upper simulated when half 74. When this occurs, the simulated wheel halves 54 and 74 serve as an actual wheel, and the tire 13 behaves as if mounted upon an actual wheel.

When the upper wheel half support 20 has been forced into the proper disposition by the drive means 82, the drive means 22 applies a rotational force to the drive shaft 24, causing the lower wheel half support to rotate 30 degrees with respect to the upper wheel half support 20. This brings the no-lead thread segments 48 and 68 into interengagement with respect to each other, thereby completing the quick release locking means and thereby preventing the wheel support halves 18 and 20 from being separated by means of forces inherent in the processing of the tires, such as, for example, tire inflation generated forces. In addition, the aforenoted 30 degree rotation brings the locking bores 44 and 66 into disposition along a common axis of elongation. Because the no-lead thread segments 48 and 68 are multi-stepped, the tire holding fixture 10 can accept and firmly hold tires of varying widths for processing.

At this point, the drive means 84 forces the locking pins 46 through the locking bores 66 defined within the upper wheel half support 20, and into the locking bores 44 defined within the lower wheel half support 18. The tire holding fixture 10 is now in the closed position, shown in FIG. 2. In this manner, the lower and upper wheel half supports 18 and 20 are joined together, so that the tire holding fixture 10 can rotate under the influence of rotational forces generated by the drive means 22, which are communicated to the tire holding fixture 10 by means of the drive shaft 24, which is connected to the spindle 14.

When the tire 13 has been completely processed as required, the drive means 22 ceases its rotation, bringing the tire holding fixture 10 to rest. The drive means 84 now retracts the locking pins 46 out of the locking bores 44 defined within the lower wheel half support 18 a distance sufficient to allow the rotation of the lower wheel half support 18 with respect to the upper wheel half support 20. The drive means 22 then rotates the lower wheel half support 18 through means of an angular rotation of 30 degrees, so as to disengage the no-lead thread segments 48 and 68. The drive means 82 causes the upper wheel half support 20 to translate upwardly, relieving the engagement between the tire 13 and the beveled surface 78 of the upper simulated wheel half 74. The upper wheel half support 20 translates upwardly into the open position, shown in FIG. 1, and the tested or processed tire 13 is removed from the tire holding fixture 10, which is now ready to process another tire.

It must be emphasized that this entire process is automatic, requiring no human control, thereby increasing the speed of the testing process. The quick release locking means employed by means of the present invention allows a significant decrease in the amount of time needed to process each production tire 13. Such means also allows a factory to have necessary versatility with respect to its machines. Specifically, because the quick release locking means is multi-stepped, the tire holding fixture 10 can hold tires of varying widths, thereby reducing the number of machines needed to service the production of different width tires. Furthermore, the tire holding fixture 10 can withstand separation forces, generated by means of the tire inflation and processing parameters, on the order of 500,000 pounds, thereby making the present invention a needed asset in the processing of tires, especially tires for trucks. These benefits of the tire holding fixture 10 of the present invention can lead to increased production of tires, and increased revenues from the sale of such tires.

While a preferred embodiment of the present invention is shown and described, it is envisioned that those skilled in the art may devise various modifications of the present invention without departing from the spirit and scope of the present invention as embodied or defined within the appended claims. The invention is therefore not intended to be limited by means of the foregoing disclosure, but only by means of the following appended claims.

The invention claimed is:

1. A tire holding fixture capable of holding a tire for use with a tire processing machine, comprising:
   a first wheel half support;
   a second wheel half support;
   one of said first and second wheel half supports being capable of translation between an open and a closed position so as to allow said tire holding fixture to accept a tire;
   said first and second wheel half supports forming a simulated wheel capable of mounting a tire thereon when said wheel half support capable of translation is disposed at said closed position;
   said first wheel half support having an inner peripheral surface;
   a first set of axially spaced projections being disposed about said inner peripheral surface of said first wheel half support;
   said second wheel half support having an outer peripheral surface, with a second set of axially spaced projections being disposed about said outer peripheral surface of said second wheel half support so as to be capable of interengagement with said first set of axially spaced projections at different relative axial positions defined between said first and second wheel half supports so as to support different tires of different width dimensions thereon;
   locking bores defined within said first and second wheel half supports; and
   locking pins disposed within said locking bores for rotatably locking said first and second wheel half supports together.

2. A tire holding fixture as defined in claim 1 wherein a cylindrical guide is disposed coaxially with respect to one of the wheel half supports so that the guide is capable of centering the wheel half supports about a common axis.

3. A tire holding fixture as defined in claim 1 wherein the projections are multiple no-lead thread segments.

4. A tire holding fixture as defined in claim 1 wherein the projections are noncontinuous, and spaced along circumferences defined by respective diameters of said peripheral surfaces.

5. A tire holding fixture as defined in claim 1 wherein one of the wheel half supports is connected to a spindle, the spindle being capable of rotation, so that one of said wheel half supports can be rotated.

6. A tire holding fixture as defined in claim 1 wherein the locking pins translate under the influence of a drive means.

7. A tire holding fixture as defined in claim 4 wherein the projections are constructed in such a manner so that they can be brought into and out of interengagement by rotating one of the wheel half supports.

8. A tire holding fixture as defined in claim 4 wherein the projections are spaced along circumferences defined by respective diameters of said peripheral surfaces in alternating 30 degree segments.

9. A tire holding fixture as defined in claim 1 wherein the projections are spaced to correspond to widths of tires.

10. A tire holding fixture capable of holding a tire for use with a tire processing machine, comprising:
    a first wheel half support;
    a second wheel half support;

one of said first and second wheel half supports being translatable between an open position and a closed position so as to allow said tire holding fixture to accept a tire; and quick release locking means for joining said first and second wheel half supports together;

said quick release locking means comprising a plurality of first, axially spaced, radial projections disposed upon said first wheel half support, and a plurality of second, axially spaced, radial projections disposed upon said second wheel of half support, said first and second, axially spaced, radial projections being interengageable with each other upon relative rotation of said first and second wheel half supports for releasably locking said first and second wheel half supports together against axial separation with respect to each other at preselected axial spacings, under the influence of forces attendant operation of said processing machine, so as to support different tires of different width dimensions thereon.

11. A tire holding fixture as defined in claim 10 wherein a cylindrical guide is disposed coaxially with respect to one of the wheel half supports so that the guide is capable of centering the wheel half supports about a common axis.

12. A tire holding fixture as defined in claim 10 wherein the quick release locking means comprises said interengaging projections disposed about peripheral surfaces of the wheel half supports, and locking pins which are capable of extending through bores in the wheel half supports.

13. A tire holding fixture as defined in claim 12 wherein the projections are noncontinuous, and regularly spaced about the wheel half supports.

14. A tire holding fixture as defined in claim 12 wherein the interengaging projections are spaced along an axis of their respective wheel half supports according to the widths of tires.

15. A tire holding fixture as defined in claim 12 wherein the projections comprise multiple no-lead thread segments.

16. A tire holding fixture as defined in claim 10 wherein simulated wheel halves are disposed about the wheel half supports, the simulated wheel halves having beveled surfaces constructed so as to mimic the construction of an actual wheel.

17. A tire holding fixture as defined in claim 16 wherein the simulated wheel halves are connected for rotation with the wheel half supports by means of toothed couplings.

18. A tire holding fixture as defined in claim 10 wherein one of the wheel half supports is connected to a spindle, the spindle being capable of rotation, so that one or both wheel half supports can be rotated, depending on the disposition of the quick release locking means.

19. A tire holding fixture as defined in claim 10 wherein the quick release locking means further includes relatively shiftable, axially extending, interengagable elements for releasably connecting the first and second wheel half supports for rotation in unison.

20. A tire holding fixture capable of holding a tire for use with a tire processing machine, comprising:

a first wheel half support;
a second wheel half support;
one of said first and second wheel half supports being translatable between an open position and a closed position so as to allow said tire holding fixture to accept a tire;
said first and second wheel half supports forming a simulated wheel capable of mounting a tire thereon when said wheel half support capable of translation is disposed at said closed position;
said first wheel half support having an inner peripheral surface;
said second wheel half support having an outer peripheral surface;
first lockably engageable means disposed upon said inner peripheral surface of said first wheel half support; and
second lockably engageable means disposed upon said outer peripheral surface of said second wheel half support for lockably interengaging said first lockably engageable means of said first wheel half support at different relative axial positions defined between said first and second wheel half supports so as to releasably lock said first and second wheel half supports together against axial separation with respect to each other under the influence of forces attendant operation of said processing machine and so as to support different tires of different width dimensions thereon.

21. A tire holding fixture as set forth in claim 20, wherein:
said first and second lockably engageable means comprise multiple no-lead thread segments.

22. A tire holding fixture as set forth in claim 21, wherein:
said thread segments are non-continuous and angularly spaced about a plurality of axially spaced circumferential loci defined upon said inner and outer peripheral surface of said first and second wheel half supports such that when said first and second wheel half supports are disposed at a first angular position with respect to each other, said thread segments of one of said first and second wheel half supports are able to be disposed within spaces defined between said thread segments of the other one of said first and second wheel half supports so as permit said first and second wheel half supports to be mated together in an unlocked state, whereas when said first and second wheel half supports are disposed at a second angular position with respect to each other as a result of one of said first and second wheel half supports being angularly rotated through means of a predetermined angular rotation from said first angular position to said second angular position, said thread segments of said one of said first and second wheel half supports are lockingly interengaged with said thread segments of said other one of said first and second wheel half supports.

23. A tire holding fixture as set forth in claim 22, wherein:
said thread segments of said first and second wheel half supports, and said spaces defined between said thread segments, comprise angular extents of 30°.

* * * * *